United States Patent [19]

Skarupa

[11] Patent Number: 4,890,696
[45] Date of Patent: Jan. 2, 1990

[54] METHOD OF ADJUSTING THE LUBRICATING TIME OF A LUBRICATION PUMP AND APPARATUS FOR CARRYING OUT THE METHOD

[75] Inventor: Günter Skarupa, Pegnitz, Fed. Rep. of Germany

[73] Assignee: Baier & Köppel GmbH & Co., Pegnitz, Fed. Rep. of Germany

[21] Appl. No.: 353,454

[22] Filed: May 18, 1989

[30] Foreign Application Priority Data

May 28, 1988 [DE] Fed. Rep. of Germany ....... 3818256

[51] Int. Cl.$^4$ ............................................. F16N 27/00
[52] U.S. Cl. ......................................... 184/7.4; 417/42
[58] Field of Search ...................... 184/7.4, 8; 417/42

[56] References Cited

U.S. PATENT DOCUMENTS

| | | | |
|---|---|---|---|
| 4,534,706 | 8/1985 | Palm et al. | 417/42 |
| 4,726,738 | 2/1988 | Nakamura et al. | 417/42 |
| 4,738,336 | 4/1988 | Smith et al. | 184/7.4 |

Primary Examiner—Carroll B. Dority
Attorney, Agent, or Firm—Toren, McGeady & Associates

[57] ABSTRACT

A method and an apparatus for adjusting the lubricating time of a lubrication pump which is driven by a motor whose rate of rotation varies. The adjustment is carried out with a cycle time which includes the lubricating time and a non-lubricating time. The lubricating pump is used in the centralized lubrication of utility vehicles. The lubricants used are lubricants which are difficult to press and have a high penetration. The lubricating time is adjusted in dependence upon the number of rotations carried out by the pump.

6 Claims, 3 Drawing Sheets

METHOD OF ADJUSTING THE LUBRICATING TIME OF A LUBRICATION PUMP AND APPARATUS FOR CARRYING OUT THE METHOD

BACKGROUND OF THE INVENTION

1. Field of the Invention

The present invention relates to a method for adjusting the lubricating time of a lubrication pump which is driven by a motor whose rate of rotation varies, particularly a direct current motor. The adjustment is carried out within a cycle time which includes the lubricating time and a non-lubricating time. The lubrication pump is used in the centralized lubrication of utility vehicles, including trailers, semi-trailers, special vehicles and the like. Preferably lubricants are utilized which are difficult to press and have a high penetration.

The present invention further relates to an apparatus for carrying out the above-described method. The apparatus includes a lubrication pump which is driven by an electric motor.

2. Description of the Related Art

In lubrication systems of the above-described type, direct current motor drives with a relatively low rate of rotation of 15 rpm are used. The tolerance of such motors is ±3 rpm. These tolerances are significantly increased depending upon the load exerted by the lubrication pump. This pressure, in turn, depends on the pressure of the lubricant, on the number of points to be lubricated, and particularly also on the prevailing temperature because the lubricants are substantially more viscous at low temperatures than at high temperatures.

In the past, the running time of the pump was adjusted in accordance with the time of operation of the vehicle involved. However, this does not take into consideration the above-mentioned changes of the rate of rotation and the attendant differences in the delivered quantities of lubricant. This means that there is always the danger of excess lubrication or too little lubrication.

It is, therefore, the primary object of the present invention to ensure that the necessary quantities of lubricant are supplied to the points to be lubricated even when the rate of rotation of the lubrication pump varies as explained above. In other words, it is to be prevented that too much lubricant reaches the points to be lubricated and that too little lubricant reaches the points to be lubricated.

SUMMARY OF THE INVENTION

In accordance with the present invention, the lubricating time is adjusted in dependence upon the number of rotations carried out by the pump.

The number of rotations of the lubrication pump represents a direct measure for the quantity of the lubricant required by the pump. If the lubricating time is adjusted to the number of rotations of the pump in accordance with the present invention, the above-explained danger of excess lubrication or too little lubrication is avoided.

The apparatus for carrying out the method according to the present invention includes a measuring device for determining the number of rotations of the lubrication pump or of the drive shaft or of the driving component of the drive motor, and a switching device for switching the drive motor of the lubrication pump on and off. Adjusted in the switching device are the cycle time composed of lubricating time and non-lubricating time as well as the number of rotations of the lubrication pump after which the drive motor has to be switched off within a cycle by means of the switching device.

Thus, the measuring device counts the rotations carried out by the lubrication pump, while the switching device processes this measurement result and ensures the appropriate switching of the drive motor.

In accordance with preferred features of the present invention, a proximity switch is provided for determining the number of rotations of the lubrication pump or of the drive means for the pump. The proximity switch has a head and generates a magnetic field at this head. A component is mounted on and revolves with the lubrication pump or the drive means for the pump and extends radially in the magnetic field. The head of the proximity switch is mounted in such proximity to the path of revolution of the lubrication pump that when the above-mentioned component passes through the magnetic field, pulses are generated by the proximity switch which are transmitted from the proximity switch to the switching device. As a result, the present invention provides a measuring apparatus which can be mounted subsequently on already existing lubrication pumps or the drive motors thereof.

In accordance with another preferred feature of the present invention, the revolving component which generates the pulses is an eccentric member of the lubrication pump.

Finally, in accordance with another feature of the present invention, when the rate of rotation of the lubrication pump falls below a certain minimum value, the switching device switches off the drive motor and switches on a trouble indicator. Thus, it is possible to switch off the lubrication pump entirely when a critical minimum rate of rotation of the lubrication pump is reached or the rate of rotation falls below this critical minimum rate of rotation. Simultaneously, a trouble indication can be provided to the person operating the vehicle.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
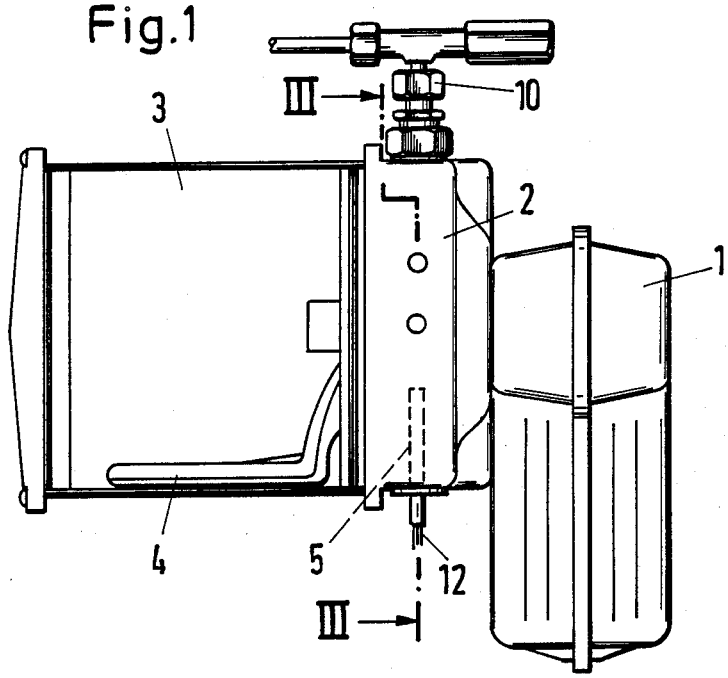
FIG. 1 is a schematic side view of a lubrication pump with drive motor.

FIG. 1 of the drawing shows a drive motor 1 in the form of a low-speed direct current motor with a rate of rotation of, for example, 15 rpm. A lubrication pump 2 with lubricant container 3 and agitator 4 is flanged or mounted directly on the drive shaft of the motor 1.

Figure 3:
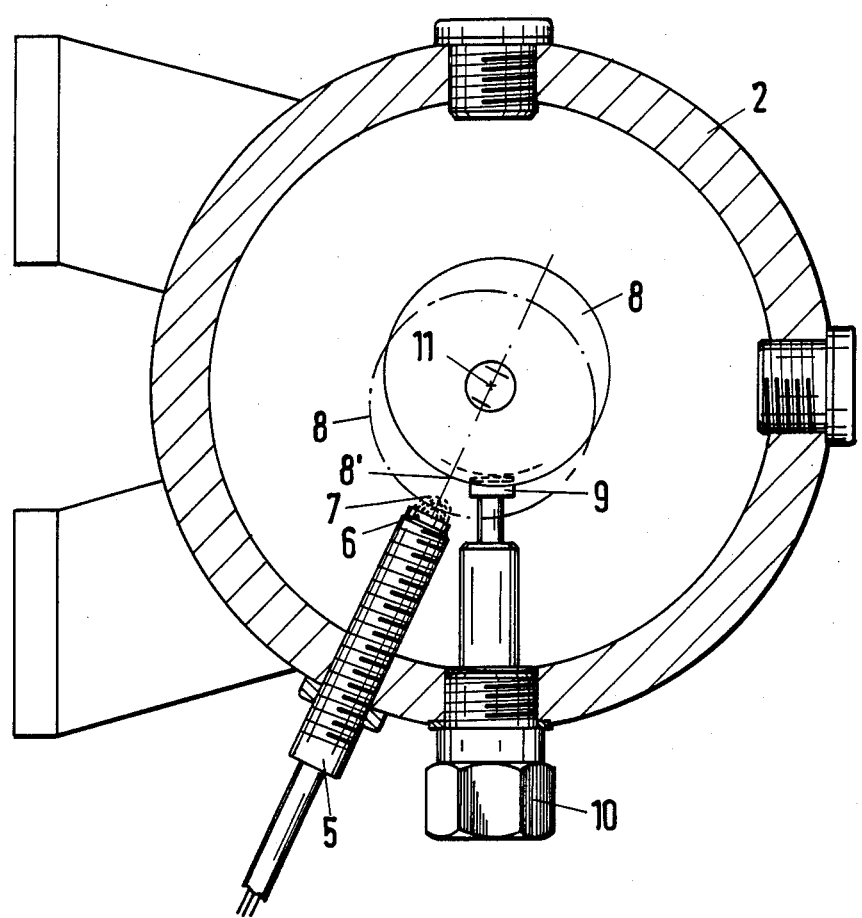
FIG. 3 is a sectional view, on a larger scale, along sectional line III—III of the FIG. 1, however, contrary to FIG. 1, the proximity switch 5 is shown at a different location.

The rotations carried out by an armature or the drive shaft of the motor 1 or by the lubrication pump 2 itself are counted. In the illustrated embodiment, counting is done by means of a proximity switch 5 in the manner illustrated in FIG. 3. A head 6 of the proximity switch 5 generates a magnetic field 7 and a structural component revolving with the rate of rotation of the lubrication pump, i.e., eccentric member 8, travels through the magnetic field 7 once for each rotation of the lubrication pump and generates a counting pulse. The position of the eccentric member is illustrated in dash-dot lines when it passes through the magnetic field 7. On the other hand, a solid line shows the position of rotation of the eccentric member 8 offset by 180° in which the portion 8′ of the eccentric member 8 located opposite the proximity switch 5 does not pass through the magnetic field 7. The eccentric member 8 additionally serves to actuate a piston 9 which delivers the lubricant. Reference numeral 10 denotes the pressure connection for further conveying the lubricant. The use of a proximity switch provides the advantage that no mechanical contact or friction is required between the switch and the revolving component of the lubrication pump. Rather, it is sufficient if that portion of the eccentric member 8 which has the greatest radial distance from the center 11 of the eccentric member 8 passes once per pump rotation through the magnetic field 7.

Figure 2:
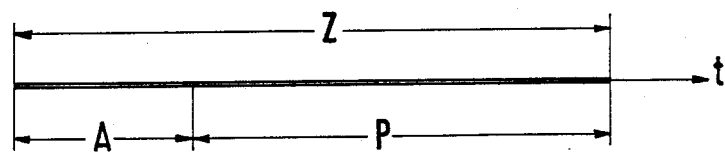
FIG. 2 is a time diagram explaining the present invention.

The counting pulses of the proximity switch 5 are supplied through line 12 to the switching device which is generally denoted by reference numeral 13. The so-called cycle time can be set at 14 of this switching device, and the number of rotations of the lubrication pump 2 after which the drive motor 1 is to be switched off can be set at 15. This relationship is illustrated in more detail in the time diagram of FIG. 2. Z indicates the cycle time which is composed of the working time A of the lubrication pump 2 and the non-working time P, i.e., the time during which the lubrication pump stands still. In accordance with the above, the working time A is set at the switching device 13. The working time A of the pump results from the adjusted number of rotations of the pump and from the time required by the drive motor for rotating the pump the set number of rotations.

For example, the working time A may be two to three minutes and the non-working time P may be seven to eight minutes, i.e., the cycle time Z may be approximately ten minutes. Of course, the above times are only examples. If the rate of rotation of the motor 1 and, thus, of the pump 2 becomes smaller, the working time A is increased and vice-versa.

Figure 4:
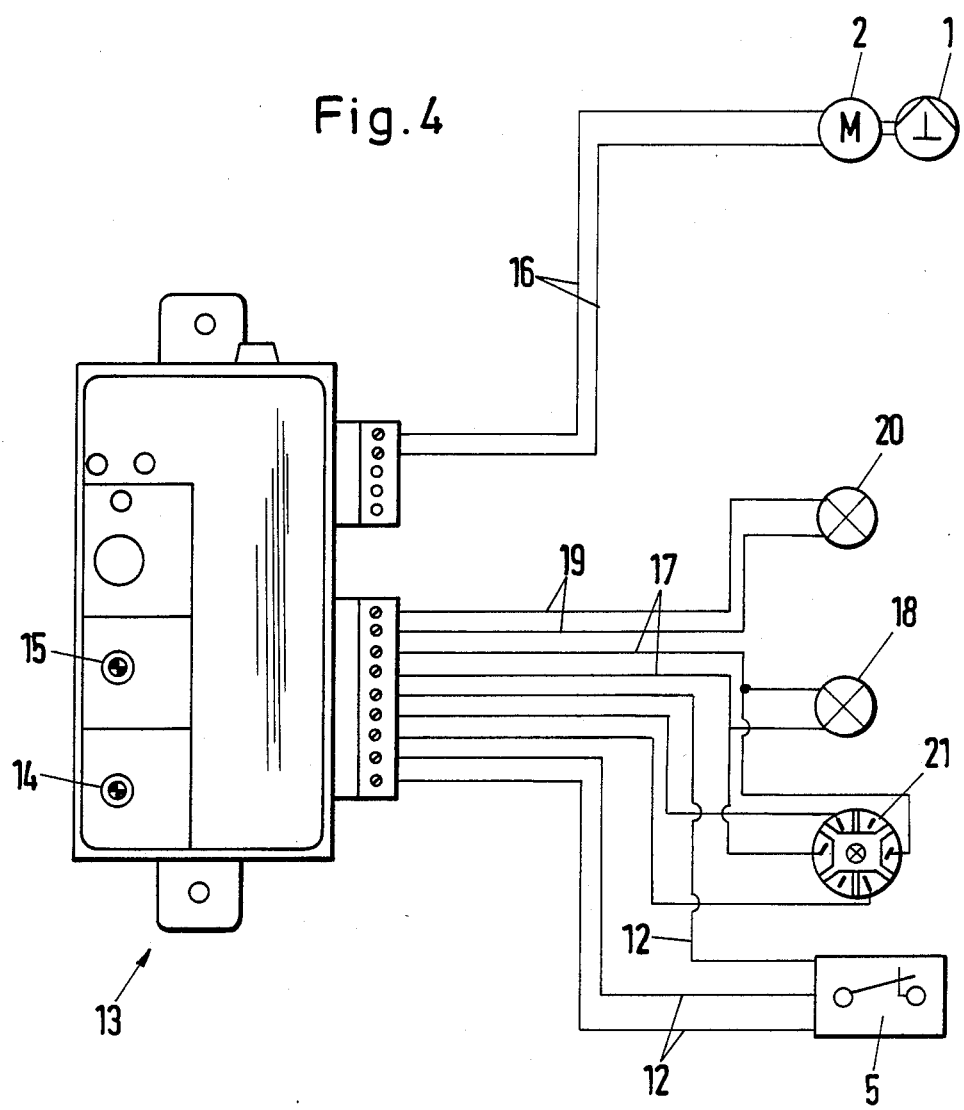
FIG. 4 is a schematic illustration of the switching device and the structural components therefor.

Lines 16 are used for switching the drive motor 1 on and off. Simultaneously with the switching on of the motor 1, a signal lamp 18 can be switched on through lines 17. Signal lamp 18 indicates that lubrication is taking place. When the rate of rotation of the motor and, thus, of the lubrication pump falls below a critical value, the motor can be switched off and a signal lamp 20 can be switched on through lines 19 to indicate the "trouble". Reference numeral 21 denotes a conventional illuminated pushbutton for a so-called intermediate lubrication. The diagram of FIG. 4 also shows the proximity switch 5 with lines 12 connecting it to the switching device 13.

While a specific embodiment of the invention has been shown and described in detail to illustrate the application of the inventive principles, it will be understood that the invention may be embodied otherwise without departing from such principles.

I claim:

1. A method for adjusting the lubricating time of a lubrication pump which is driven by a motor having a drive shaft whose rate of rotation varies, the lubrication pump being used in a centralized lubrication of a utility vehicle and preferably by means of lubricants which are difficult to press and have a high penetration, the method comprising carrying out the adjustment within a cycle time which includes a lubricating time and a non-lubricating time, and adjusting the lubricating time in dependence upon the number of rotations of the drive shaft.

2. An apparatus for adjusting the lubricating time of a lubrication pump which is driven by a motor having a drive shaft whose rate of rotation varies, the lubrication pump being used in the centralized lubrication of a utility vehicle by means of lubricants which are difficult to press and have a high penetration, comprising a measuring device for determining the number of rotations of the drive shaft, and a switching device connected to said measuring device for switching the drive motor of the lubrication pump on and off, means for adjusting in the switching device a cycle time which includes a lubricating time and a non-lubricating time, and means for adjusting the number of rotations of the drive shaft after which the drive motor has to be switched off within a cycle by means of the switching device.

3. The apparatus according to claim 2, wherein the motor is a direct current motor.

4. The apparatus according to claim 2, wherein the measuring device for determining the number of rotations of the lubrication pump comprises a proximity switch, the proximity switch having a head, means for generating a magnetic field provided at the head, a structural component being mounted on and revolving with the lubrication pump, the head of the proximity switch being mounted in such proximity to the path of revolution of the lubrication pump that the structural component passes through the magnetic field of the proximity switch, means for generating pulses when the structural component passes through the magnetic field of the proximity switch, and means for transmitting the pulses from the proximity switch to the switching device.

5. The apparatus according to claim 4, wherein the structural component is an eccentric member of the drive shaft of the lubrication pump.

6. The apparatus according to claim 2, wherein the switching device comprises means for switching off the drive motor and switching on a trouble indication when the rate of rotation of the drive shaft falls below a predetermined minimum rate of rotation.

* * * * *